United States Patent
Reitsema

(10) Patent No.: US 11,274,989 B2
(45) Date of Patent: Mar. 15, 2022

(54) METHOD FOR DETERMINING THE STRUCTURAL INTEGRITY OF AN INFRASTRUCTURAL ELEMENT

(71) Applicant: HEIJMANS N.V. [NL/NL], Rosmalen (NL)

(72) Inventor: Albert David Reitsema, Rosmalen (NL)

(73) Assignee: HEIJMANS N.V., Rosmalen (NL)

( * ) Notice: Subject to any disclaimer, the term of this patent is extended or adjusted under 35 U.S.C. 154(b) by 242 days.

(21) Appl. No.: 16/302,326

(22) PCT Filed: May 17, 2017

(86) PCT No.: PCT/NL2017/050309
§ 371 (c)(1),
(2) Date: Nov. 16, 2018

(87) PCT Pub. No.: WO2017/200380
PCT Pub. Date: Nov. 23, 2017

(65) Prior Publication Data
US 2020/0011762 A1 Jan. 9, 2020

(30) Foreign Application Priority Data
May 18, 2016 (NL) ........................ 2016794

(51) Int. Cl.
*G01M 5/00* (2006.01)
(52) U.S. Cl.
CPC ........ *G01M 5/0041* (2013.01); *G01M 5/0008* (2013.01)
(58) Field of Classification Search
CPC .................. G01M 5/0008; G01M 5/0041
See application file for complete search history.

(56) References Cited

U.S. PATENT DOCUMENTS

| | | | |
|---|---|---|---|
| 6,459,050 B1 * | 10/2002 | Muhs ................... | G01G 19/022 177/133 |
| 9,267,862 B1 * | 2/2016 | Kavars ................ | G01M 5/0033 |

(Continued)

FOREIGN PATENT DOCUMENTS

EP 3187838 * 5/2017 ........... G01G 19/024

OTHER PUBLICATIONS

Maeck et al., "Damage assessment using vibration analysis on the Z24-bridge", 2003, Mechanical systems and Signal Processing, 17(1) 133-142 (Year: 2003).*

(Continued)

*Primary Examiner* — Stephanie E Bloss
(74) *Attorney, Agent, or Firm* — Suiter Swantz pc llo

(57) ABSTRACT

The invention relates to a method for determining the structural integrity of an infrastructural element, comprising the steps of:
  measuring deformations, such as displacements or rotations, during a predetermined time period with deformation measurement means arranged at or near a main structural body of the infrastructural element, in particular supports of the main structural body, characterized by
  determining the load configuration of the main structural body over the course of the predetermined time period, such as the load configuration concerning the loading perpendicular to a longitudinal direction of the main structural body,
  calculating the bending stiffness (EI) of the main structural body over the course of the predetermined time period, from the load configuration and deformations measured by the deformation measurement means, and
  comparing the bending stiffness (EI) at the end of the predetermined time period to the bending stiffness (EI)

(Continued)

at the start of the predetermined time period to establish a difference in bending stiffness (EI) over the course of the predetermined time period.

5 Claims, 3 Drawing Sheets

(56) References Cited

U.S. PATENT DOCUMENTS

| | | | | |
|---|---|---|---|---|
| 2002/0148175 A1* | 10/2002 | Ouchi | ............... | E01D 1/00 |
| | | | | 52/167.3 |
| 2006/0137914 A1* | 6/2006 | Hodac | ............ | G01G 19/024 |
| | | | | 177/132 |
| 2007/0006652 A1* | 1/2007 | Weldon, Jr. | ....... | G01M 5/0041 |
| | | | | 73/579 |
| 2007/0240526 A1* | 10/2007 | Fowler | ............ | G01B 7/16 |
| | | | | 73/862.471 |
| 2012/0073382 A1* | 3/2012 | Spaltmann | ......... | G01N 29/043 |
| | | | | 73/788 |
| 2014/0180609 A1* | 6/2014 | Berggren | ............ | E01B 35/12 |
| | | | | 702/42 |
| 2018/0230799 A1* | 8/2018 | Coss | .............. | E21B 47/16 |

OTHER PUBLICATIONS

Research Team et al., Bridge Monitoring PI: Jacobo Bielak, Jan. 2, 2014,http://utc.ices.cmu.edu/utc/CMUReports 2013 2/Final Report.
R.A.P. Correa et al, Identificacao de danos estruturais em placas baseada em um modelo de dano continuo, Revista Internacional De Metodos Numericos Para Calculo Y Disenoen Inginieria, vol. 32, No. 1, Jan. 1, 2016, pp. 58-64.
J.Maeck et al., Damage Assessment Using Vibration Analysis on the Z24-Bridge, Mechanical Systems and Signal Processing, vol. 17, No. 1, Jan. 1, 2003, pp. 133-142.
International Search Report for International Application No. PCT/NL2017/050309 dated Aug. 31, 2017.

* cited by examiner

METHOD FOR DETERMINING THE STRUCTURAL INTEGRITY OF AN INFRASTRUCTURAL ELEMENT

FIELD OF THE INVENTION

The present invention relates to a method for determining the structural integrity of an infrastructural element, comprising the step of:
 measuring deformations, such as displacements or rotations, during a predetermined time period with deformation measurement means arranged at or near a main structural body of the infrastructural element, in particular supports of the main structural body.

BACKGROUND OF THE INVENTION

In the Netherlands infrastructure has always been important with regard to its status as transport country with Rotterdam as Europe's largest port. There has been a large infrastructural expansion in-between the sixties and eighties. Public authorities face a major replacement task given that most of the existing bridges are designed to serve for 50 years. This, combined with a large historical increase in traffic frequency and loads combined with new insights regarding structural behaviour, makes that the performance of some existing bridges can be questionable. Still, there isn't an indication of structural failing in the near future, so it is clear that the actual capacity of existing bridges is not directly related to a service life of 50 years the bridges were designed for.

Till now, for far most of the existing bridges qualitative and non-continuous methods are used to determine degradation. These methods are not able to give an accurate assessment of the real structural performance of a structure. Therefore, it can be favourable to apply a "structural health monitoring" (SHM) system on civil structures to conclude whether or not an intervention is mandatory (Cremona 2014). This makes that decisions regarding operating conditions can be made based on quantitative data. In addition to the re-evaluation of older existing bridges, SHM can be used to measure the load response of new bridge techniques and/or materials.

Patent literature discloses several such "smart" methods, in particular methods to investigate the bridge's structural integrity based on local deflection measurements.

For instance, Chinese Utility Model CN 2040 074 99 U discloses an automatic bridge monitoring system for measuring local structural deflection based on wireless sensors.

Chinese Utility Model CN 2014 38141 U furthermore discloses a dynamic bridge deflection test device that provides long-term monitoring of the deflection of the bridge deck by using magneto-telescopic deflection sensors arranged below the bridge deck.

A problem, however, with such methods is that a lot of local phenomena are to be measured and a complex system of sensors, data transmission networks, analysis systems, et cetera, is thus required to provide the desired monitoring system. Such complex systems are of course prone to malfunctioning and are expensive to install and maintain.

Thus, there is a need for a cheaper, more "global" monitoring method for infrastructural elements, such as bridges, that does not require the installation of complex systems incorporating a multitude of local sensors and associated data systems.

SUMMARY OF THE INVENTION

Thereto, according to the invention the method is characterized by:
 determining the load configuration of the main structural body over the course of the predetermined time period, such as the load configuration concerning the loading perpendicular to a longitudinal direction of the main structural body,
 calculating the bending stiffness (EI) of the main structural body over the course of the predetermined time period, from the load configuration and deformations measured by the deformation measurement means, and
 comparing the bending stiffness (EI) at the end of the predetermined time period to the bending stiffness (EI) at the start of the predetermined time period to establish a difference in bending stiffness (EI) over the course of the predetermined time period.

The inventors have shown the insight that due to deterioration of the infrastructural element, material properties and/or geometrical properties of the main structural body, such as the bridge deck in case of a bridge, will change.

These changes will result in a change of the bending stiffness (EI) of the main structural body, such as the bridge deck. This change in bending stiffness can then be used as a "global" indicator of the amount of occurred damage.

The bending stiffness can be found as a relation between the deformations measured at certain positions at or near the main structural body and the load configuration on the main structural body.

The above method according to the invention requires only relatively few deformation measurement means (sensors) at relatively few locations. Consequently, associated data transmission systems, analysis systems, et cetera, can be much simpler in design, therefore being less prone to malfunctioning and therefore being cheaper to install and maintain.

Although the above method is highly suitable for use with bridges, the infrastructural element can also be a quay wall, a dike, a water supply duct, a sewer system duct, an electricity line, a road, a lock or a foundation, or any other infrastructural element.

However, advantageously the infrastructural element is a bridge, the main structural body is a bridge deck and the supports are bridge supports.

In case the load configuration is not known, the load configuration can be derived from reaction forces measured by force measurement means (although, to be factually correct, displacement measurement means will mostly be used to determine such forces) arranged at the supports.

Preferably, the bridge supports comprise bridge bearings and the force measurement means are arranged at the bridge bearings, wherein the force measurement means establish the force at the bridge bearing from the elastic deformation and the spring constant of the bridge bearing. The function of the bridge bearings is to transfer forces from the superstructure to the substructure. There are several different bearing types that are being used nowadays or in the past to accommodate different loading and movement requirements. Since (reinforced) elastomeric bearing pads have by far the largest market share for common concrete road bridges, these are preferably to be used. Also, unreinforced elastomeric bearings, pot bearings, spherical bearings and the like can be used.

In an embodiment of the aforementioned method, the bending stiffness (EI) of the bridge deck over the predetermined time period is calculated based on a moving load passing over the bridge deck, such as a train or a car, comprising the steps of:
  determining the type of load,
  determining the position of the load,
  determining the speed of the load,
  calculating influence lines,
  establishing kinematic relations between the load configuration of the bridge deck caused by the load and the forces measured by the force measurement means, and
  calculating the bending stiffness (EI) of the bridge based on the load configuration resulting from the load and the deformations measured by the deformation measurement means.

The above method advantageously allows to determine the load history of the main structural body, such as the bridge deck, from the reaction force history of this bridge deck as well as a method to determine the bending stiffness when this load history is known. When the load is a vehicle having axles, the axle loads usually have a static and a dynamic component. In most situations the static axle load is by far the largest part of the total axle load. Over the length of for instance the bridge deck this component will be constant. The magnitude of this static component will range from 2 kN up to 115 kN for regular road traffic. Since overloading of trucks is a regular occurrence this range can be expanded up to around 250 kN. Often there is also a noise component. The noise component is the part of the measured axle load that can't be explained by the two previously mentioned components. Noise can be caused by lots of factors, but the most important ones are axle dynamics with other causes than the expansion joint, sensor noise and weather influences.

For a one-dimensional main structural element, e.g. a bridge, the axle loads are preferably to be modelled as point loads which are constant over the span of the bridge. This means that both the dynamic component and noise are excluded from the model. The point load will move over the length of the bridge deck with a constant speed v.

For three-dimensional models, the axle load can be assumed to be equally distributed over the wheels. Again the load will be constant over the length of the bridge deck, meaning that the dynamic component and noise are excluded from the model and the load will move over the length of the bridge deck with a constant speed (v).

Different models can be used to model the main structural body, in casu the bridge deck, such as:
  Simply supported one dimensional beam
  Infinitely stiff plate on spring supports
  Isotropic plate on stiff supports
  Orthotropic plate on stiff supports
  Orthotropic plate on spring supports
  Many other models are conceivable though.

Two dimensional models are preferably considered with only two supports per side, three supports per side, and seven supports per side. The system with two supports per side is the most simple system for a bridge deck possible. It is expanded to three supports per side because this is the most simple system that is statically indeterminate along the width of the bridge deck. A system with seven supports per side is modelled because of the increased complexity and resemblance to existing bridge decks.

Preferably, the bridge deck is modelled as a simply supported beam. From the given model the support reactions at e.g. a support A and support B can be determined as a function of time. To do this, first the influence lines for the support reactions are determined. These influence lines are given by the magnitude of the support reaction at the concerning support resulting from a unit load located at a location x along the main structural body. From these influence lines, which are a function of x, the influence lines are determined as a function of time. Multiplying the results with the point load of a single axle $P_n$ gives the support reactions as a function of t for the passing of a single axle. The summation of N of these equation results in the total support reaction at A and B as a function of time. The magnitude of the axle load is equal to the change in support reaction A upon entering the bridge or the change in support reaction B upon leaving the bridge ($\Delta R_{i,A}$ and $\Delta R_{i,B}$). This change is also equal to the change in the total reaction force ($R_{i,A+B}$). By measuring these changes for each individual axle or axle group it is theoretically possible to determine the magnitude of the axle loads or axle group loads.

By looking for a two corresponding changes in support reaction at support A and support B ($\Delta R_{i,A}$ and $\Delta R_{i,B}$), or two corresponding changes in the sum of support reactions ($R_{i,A+B}$) it is be possible to identify the time moment at which an axle enters $t_{i,e}$ and leaves $t_{i,l}$ the bridge. From these two time moments the axle speed can be determined:

$$v_i = \frac{L}{t_{i,l} - t_{i,e}}.$$

As we now have a time moment of entering the bridge and a speed the x-location can be calculated at any time moment:

$$x_i = v_i \cdot (t - t_{i,e})$$

It should be noted that this method to determine the x-location of an axle will only work under the assumption that there are no axles overtaking each other while on the bridge.

Alternatively, the bridge deck can be modelled as an infinitely stiff plate on spring supports, i.e. a two-dimensional model. A very simple two dimensional model for a bridge deck is an infinitely stiff plate on spring supports. The previously described axle can be modelled on the bridge deck.

For the infinitely stiff plate some additional assumptions have to be made, such as: no dynamic effects/smooth bridge joint, time on bridge is very short, ratio $$\frac{EI}{k}$$

is very large, no changing lanes while on the bridge deck, the load on both tires of an axle is equal and the axle track is set to a constant value.

The other models, such as an isotropic plate on spring supports, will not be further discussed here.

Finally, the bending stiffness (EI) can then be determined. The models that are preferably to be used are the:
  Simply supported one dimensional beam, and the
  Orthotropic plate on spring supports
These models will be further explained with reference to drawings in the detailed description.

For the same model for the simply supported beam as described earlier, the equivalent bending stiffness will be calculated as a function of the loading determined in the same section, and the measured rotations at the support. To do this first the influence line for rotations at a single support is determined. This influence line can be established by applying well-known engineering formulas (in Dutch known as "vergeet-me-nietjes"), then:

$$\text{For } 0 > x > L \quad I_{\varphi,supportA} = 0$$

$$\text{For } 0 < x < L \quad I_{\varphi,supportA} = \frac{-x(L-x)(2L-x)}{6EIL} = \frac{-x^3 + 3Lx^2 - 2L^2x}{6EIL}$$

Multiplying the influence line with the magnitude of the load n, $P_n$, and changing x to $x_n$ gives the rotation at the support due to load n. Summing up all these rotations for load n=1 to n=N gives us the total rotation.

$$\text{For } 0 > x > L \quad \varphi_{A,n} = 0$$

$$\text{For } 0 < x < L \quad \varphi_{A,n} = \frac{P_n \cdot (-x_n^3 + L^2 x_n)}{6EIL}$$

$$\varphi_{A,n} = \sum_{n=1}^{N} (\varphi_{A,n}) = \sum_{n=1}^{N} \left( \frac{P_n \cdot (-x_n^3 + L^2 x_n)}{6EIL} \right) =$$

$$\frac{1}{EI} \sum_{n=1}^{N} \left( \frac{P_n \cdot (-x_n^3 + L^2 x_n)}{6EIL} \right)$$

Now the bending stiffness can be determined as:

$$EI = \frac{1}{\varphi A} \sum_{n=1}^{N} \left( \frac{P_n \cdot (-x_n^3 + L^2 x_n)}{6L} \right)$$

The output variables calculated before with the measured support rotations can be used to determine the bending stiffness of the simply supported beam as a function of time.

The same method can be applied for the orthotropic plate on spring supports, with the only difference that for each individual lane a separate influence line has to be determined. These influence lines are preferably to be determined by using computer software, such as Scia Engineer (instead of hand calculations). This model will be explained in detail with reference to drawings in the detailed description.

The influence lines for the rotations at the support can be found by performing a fourth order polynomial fit for the obtained data points. A fourth order polynomial has been chosen because this gave a near-perfect fit for the data points. A higher order polynomial would of course give a better fit but this would make the equations harder to handle. This results in the following equations:

$$I_{\varphi,Lane\ 1\ \&\ 4} = 9.0071 \cdot 10^{-11} \cdot x^4 - 2.8203 \cdot 10^{-9} \cdot x^3 - 1.9723 \cdot 10^{-8} \cdot x^2 + 8.0688 \cdot 10^{-7} \cdot x - 2.7327 \cdot 10^{-7}$$

$$I_{\varphi,Lane\ 2\ \&\ 3} = -5.7965 \cdot 10^{-11} \cdot x^4 + 4.8628 \cdot 10^{-9} \cdot x^3 - 1.5914 \cdot 10^{-7} \cdot x^2 + 1.7249 \cdot 10^{-6} \cdot x - 6.8949 \cdot 10^{-7}$$

Now to find a value for the bending stiffness (EI) the same procedure as for the simply supported beam model is followed. However, this time there is no EI in the equation. To solve this problem the following ratio is added:

$$\frac{EI_{theoretical}}{EI_{eq}}.$$

In this ratio EI is the theoretical bending stiffness of the bridge deck used in e.g. the Scia model, while $EI_{eq}$ is the bending stiffness to be obtained using the method:

$$I_{\varphi,Lane\ 1\&4} = \frac{EI_{theoretical}}{EI_{eq}} (9.0071 \cdot 10^{-11} \cdot x^4 - 2.8203 \cdot 10^{-9} \cdot x^3 - 1.9723 \cdot 10^{-8} \cdot x^2 + 8.0688 \cdot 10^{-7} \cdot x - 2.7327 \cdot 10^{-7})$$

$$I_{\varphi,Lane\ 2\&3} = \frac{EI_{theoretical}}{EI_{eq}} (-5.7965 \cdot 10^{-11} \cdot x^4 + 4.8628 \cdot 10^{-9} \cdot x^3 - 1.5914 \cdot 10^{-7} \cdot x^2 + 1.7249 \cdot 10^{-6} \cdot x - 6.8949 \cdot 10^{-7})$$

Again the output values as calculated earlier, together with the measured support rotation at the indicated support, can be used to extract values for the $EI_{eq}$. These values should be looked at individually per lane.

In practice it would be difficult to find the exact influence lines from a theoretical model due to the model parameters being largely unknown. It would be easier to obtain these lines by means of calibration. This would be done by having a vehicle of known, large weight with a known axle configuration and speed pass over the bridge deck and measuring the support rotations. Now the resulting rotations should be a superposition of a multiple influence lines for the considered lane.

If necessary, the aforementioned method may further comprise the step of further inspecting the infrastructural element when the difference in bending stiffness (EI) has exceeded a predetermined value, such as for fatigue, cracks or geometrical damage.

BRIEF DESCRIPTION OF THE DRAWINGS

The present invention will be explained hereafter with reference to the drawings. Therein.

DETAILED DESCRIPTION

Figure 1:
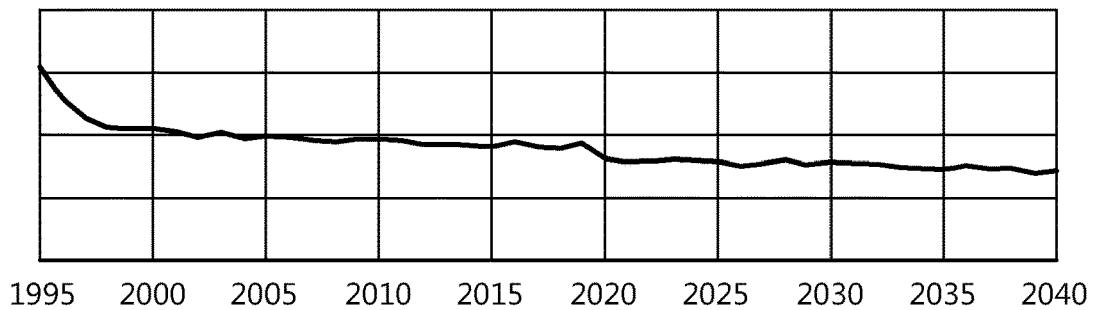
FIG. 1 shows the development of the equivalent bending stiffness over the years.

In FIG. 1 the development of an "equivalent bending stiffness" of a bridge deck can be seen in a period from 1995 (commissioning) up until 2040. A rapid decrease in bending stiffness can be observed from 1995 to 1997 which is caused by initial changes to the structure (e.g. expected cracking of the concrete with small crack width). After this a gradual decrease of the bending stiffness from year 1997 2019 can be seen. Further a sudden drop in 2019-2020 and a further gradual decrease from 2020 2040 are shown.

The gradual decrease in bending stiffness is expected to be caused by gradual deterioration of the concrete and reinforcement/pre-stressing steel while the sudden drop is expected to be caused by an unexpected event like an earthquake, extremely heavy transport or damaging of a pre-stressing tendon. The bending stiffness in this graph has been calculated at certain moments in time when a load is present on the structure.

The Simply Supported Beam Model

As stated before, the simply supported beam model will now be explained in more detail with reference to FIG. 2.

A simply supported beam with length L will be considered. A number N of point loads each representing the axle of a truck with magnitude $P_i$ will move over this beam in the x-direction all with the same speed v. The spacing distance of each axle with respect to the first one is called $d_i$. By definition $d_1=0$. At $t=0$ the location of $P_1$ will be by definition at $x=0$.

From the given model the support reactions at support A and support B will be determined as a function of time. To do this first the influence lines for the support reactions are determined. These influence lines are given by the magnitude of the support reaction at the concerning support resulting from a unit load located at location x:

$$\text{For } 0 > x > L \quad I_{R,A} = I_{R,B} = 0$$

$$\text{For } 0 < x < L \quad I_{R,A} = 1 - \frac{x}{L}$$

$$I_{R,B} = \frac{x}{L}$$

Figure 3:
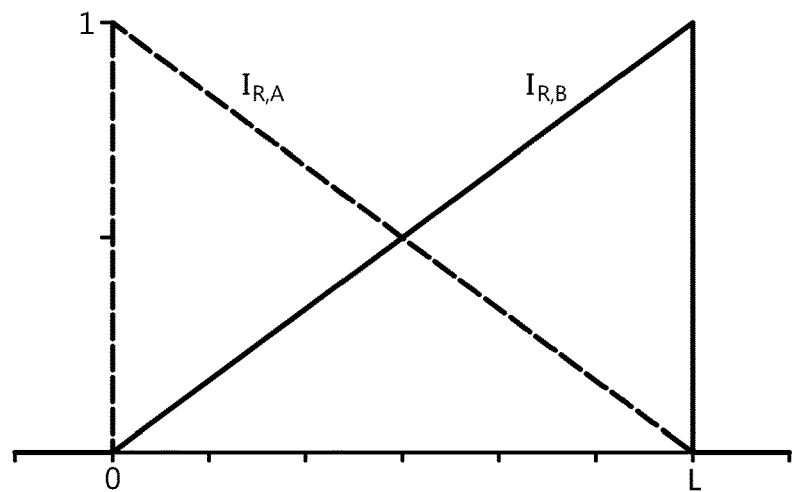
FIG. 3 shows influence lines support reactions.

The influence lines for the reaction force at both supports are shown in FIG. 3.

From these influence lines which are a function of x the influence lines are determined as a function of time. This is done by substitution of $x_n$:

$$x_n = (v \cdot t) - d_n$$

$$\text{For } 0 > (v \cdot t) - d_n > L \quad I_{R,A} = I_{R,B} = 0$$

$$\text{For } 0 < (v \cdot t) - d_n < L \quad I_{R,A} = 1 - \frac{(v \cdot t) - d_n}{L}$$

$$I_{R,B} = \frac{(v \cdot t) - d_n}{L}$$

Multiplying the results with $P_n$ gives the support reactions as a function of t for the passing of a single axle. The summation of N of these equation results in the total support reaction at A and B as a function of time.

$$R_A(t) = \sum_{n=1}^{N} P_n \cdot I_{R,A}$$

$$R_B(t) = \sum_{n=1}^{N} P_n \cdot I_{R,B}$$

These two reaction forces summed up results in the total reaction force of the bridge deck:

$$R_{A+B}(t) = \sum_{\substack{n=1 \\ 0<(v\cdot t)-d_n<L}}^{N} P_n$$

Therein, the total vertical reaction force of the bridge should be equal to the sum of the axle loads of the axles that are present on the bridge deck.

Axle Load Magnitude

Figure 2:
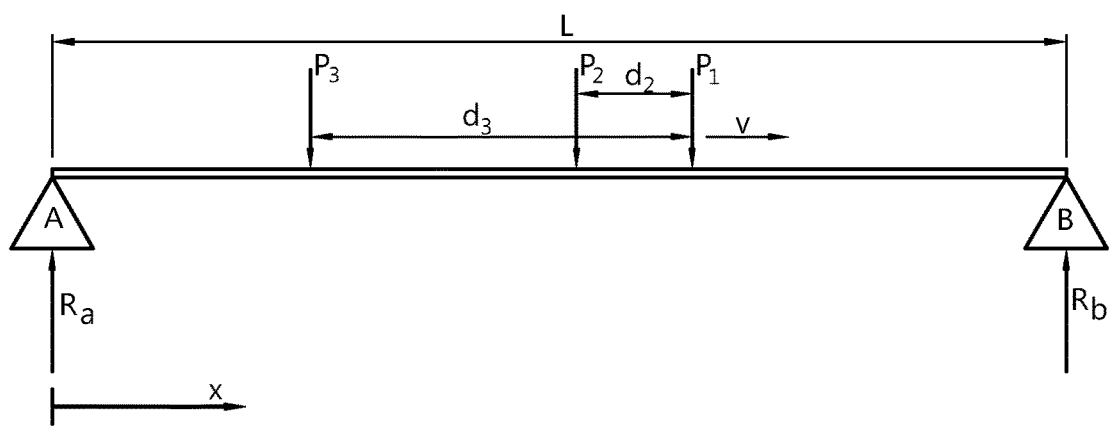
FIG. 2 shows a simply supported beam model.

As can be seen in FIGS. 2 and 3 the magnitude of the axle load is equal to the change in support reaction A upon entering the bridge or the change in support reaction B upon leaving the bridge ($\Delta R_{i,A}$ and $\Delta R_{i,B}$). This change is also equal to the change in the total reaction force ($R_{i,A+B}$). By measuring these changes for each individual axle or axle group it is possible to determine the magnitude of the axle loads or axle group loads.

Axle Load Location

X-Location

By looking for a two corresponding changes in support reaction at support A and support B ($\Delta R_{i,A}$ and $\Delta R_{i,B}$), or two corresponding changes in the sum of support reactions ($R_{i,A+B}$) it is possible to identify the time moment at which an axle enters $t_{i,e}$ and leaves $t_{i,l}$ the bridge. From these two time moments the axle speed can be determined:

$$v_i = \frac{L}{t_{i,l} - t_{i,e}}.$$

As we now have a time moment of entering the bridge and a speed the x-location can be calculated at any time moment:

$$x_i = v_i \cdot (t - t_{i,e})$$

It should be noted that this method to determine the x-location of an axle will only work under the assumption that there are no axles overtaking each other while on the bridge.

Y-Location

Since the simply supported beam model is a one-dimensional model there is no y-location to be determined. The y-location will be determined for the two-dimensional models in the following chapters.

The Orthotropic Plate on Spring Supports

The orthotropic plate on spring supports is the model that is closest to a real bridge deck. The change in reaction forces due to a change in stiffness of the bearings has a significant impact on the applicability of the method of obtaining the axle load and locations. In this model an orthotropic slab will be modelled with the following properties:

$$I_x = 1.0 \cdot 10^{10} \text{ mm}^4/\text{m}$$

$$I_y = 1.0 \cdot 10^{9} \text{ mm}^4/\text{m}$$

$$\frac{I_y}{I_x} = \frac{1}{10}$$

The element properties are shown in the box below:

Modulus of elasticity:

$E_{element} = E_{deck} = 32.800$ MPa (uncracked $C30/37$)

Shear modulus $G_{xy,element} = \frac{E_{deck}}{2(1+v)} \sqrt{\frac{I_{y,deck}}{I_{x,deck}}} = 4321.8$ MPa Element thickness, x: $d_{x,element} = \sqrt[3]{12 I_{x,deck}} = 493.2$ mm Element thickness, y: $d_{y,element} = \sqrt[3]{12 I_{y,deck}} = 228.9$ mm Further the plate is supported on fourteen spring supports in total. The stiffness of these spring supports is varied between 2500, 1000 and 500 kN/mm. These stiffnesses have been chosen for the following reasons:

2500 kN/mm, because this is an approximation for the lower boundary stiffness for a reinforced rubber bearing with dimensions 350×280×45, 1000 and 500 kN/mm, because it is expected that a lower stiffness will cause a larger change in support reactions compared to the infinitely stiff case.

All assumptions that hold for the isotropic bridge deck also hold for the orthotropic bridge deck on spring supports. The properties of this bridge deck are the following:

Length: 20 m
Width: 15 m
Model type: Two heights
Thickness, x: As described
Thickness, y: As described
E-modulus: 32.800 MPa (uncracked concrete C30/37)
k: Varied between 2500, 1000 and 500 kN/mm The resulting support reactions from the axle passing over the lanes are then calculated for each of the supports.

Figure 4:
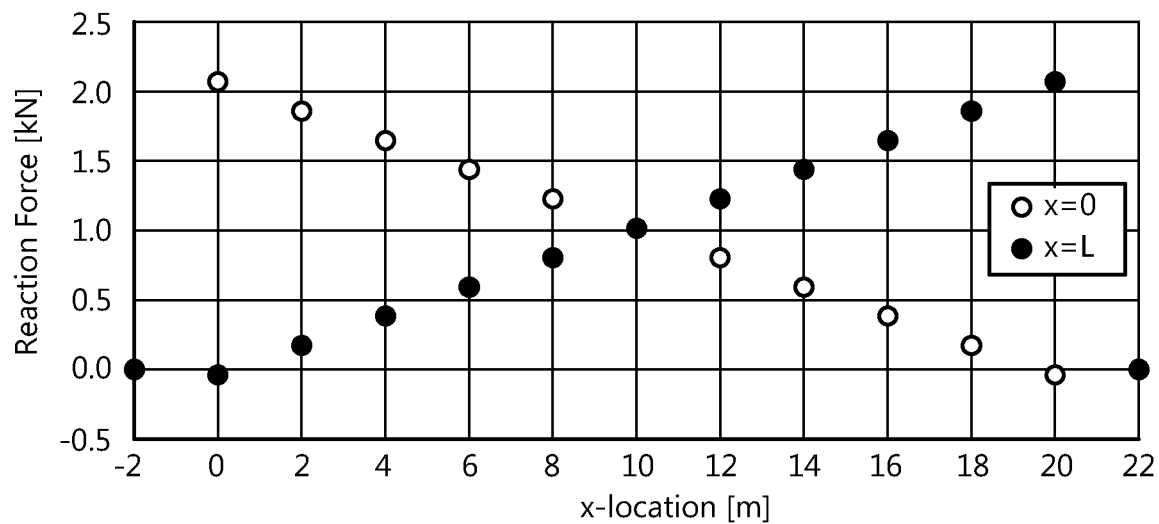
FIG. 4 shows summed reaction forces.

It can be seen that there is hardly any difference between an orthotropic plate with infinitely stiff supports and the orthotropic plate with spring supports. Again the reaction forces at x=0 and x=L are summed up. This sum of the reaction forces at x=0 and x=L are shown in FIG. 4.

Axle Load Magnitude

It can be concluded that the axle load magnitude can be found in exactly the same manner as for the simply supported beam.

Axle Load Location

X-Location

Since the bridge deck is still simply supported the summed reaction forces at x=0 and x=L remain the same. This means that nothing changes for the determination of the x-location.

Y-Location

The y-location is determined in the same way as for an infinitely stiff plate, an isotropic plate and an orthotropic plate. It can be seen in table 1 that it is still possible to determine this location very accurately. Again since nothing has changed about the moment equilibrium this is not surprising:

TABLE 1

| k [kN/mm] | Lane nr. | Real y-location [mm] | y-location x = 0 [mm] | y-location x = L [mm] |
|---|---|---|---|---|
| 2500 | 1 | 1875 | 1859 −0.9% | 1859 −0.9% |
| | 2 | 5625 | 5653 +0.5% | 5641 +0.3 |
| 1000 | 1 | 1875 | 1854 −1.1% | 1859 −0.9% |
| | 2 | 5625 | 5639 +0.2% | 5628 +0.1% |

TABLE 1-continued

| k [kN/mm] | Lane nr. | Real y-location [mm] | y-location x = 0 [mm] | y-location x = L [mm] |
|---|---|---|---|---|
| 500 | 1 | 1875 | 1887 +0.6% | 1893 +0.1% |
| | 2 | 5625 | 5712 +1.5% | 5662 +0.7% |

Determining the Bending Stiffness (EI)

A value for the bending stiffness of the bridge deck can be determined for a vehicle passing over this bridge deck. This bending stiffness provides information about the structural condition of the bridge deck. This will be done by looking at the actual (measured) deformations of the bridge deck and comparing these too the expected deformations of this bridge deck for different models of statically determined bridge decks. The two simple models as discussed before will be considered. Below an explanation will be given on how to translate an input in terms of:

The magnitude of the axle loads
Defined as the static component of the axle force exerted on the bridge deck in kN
The x-location of the axles as a function of time
Defined as a time of entering and leaving the bridge
Speed is assumed to be constant
The y-location of the axle
Defined as a number assigned to the lane on which the axle is present
y-location is assumed to be constant
The measured rotation at the support
Determined by measuring two deformations on opposite sides of the support To an output in terms of:
The equivalent bending stiffness of the bridge deck
Defined as a value of $EI_{eq}$ in Nmm²

The models that will be considered in this chapter are the following:
Simply supported one dimensional beam
Orthotropic plate on spring supports These models are considered because the simply supported one dimensional beam is the most simple possible model for a bridge, and the orthotropic plate on springs supports is the most advanced model.

The Simply Supported Beam

For the same model for the simply supported beam as described earlier, the equivalent bending stiffness will be calculated as a function of the loading determined in the same section, and the measured rotations at the support. To do this first the influence line for rotations at a single support is determined. This influence line is found using a "vergeet-me-nietje" as shown below:

| | $\theta_1 = \dfrac{Pb(l^2-b^2)}{6lEI}$ $\theta_2 = \dfrac{Pab(2l-b)}{6lEI}$ | $y = \dfrac{Pbx}{6lEI}(l^2-x^2-b^2)$ for $0 < x < a$ $y = \dfrac{Pb}{6lEI}\left[\dfrac{l}{b}(x-a)^3 + (l^2-b^2)x - x^3\right]$ for $a < x < l$ |
|---|---|---|

The "vergeet-me-nietje" for $\theta_1$ has been used where a is substituted by x, and b is substituted by (L−x). Further the equation for $\theta_1$ has been divided by P.

For $0 > x > L$ $\quad I_{\varphi,supportA} = 0$

Figure 5:
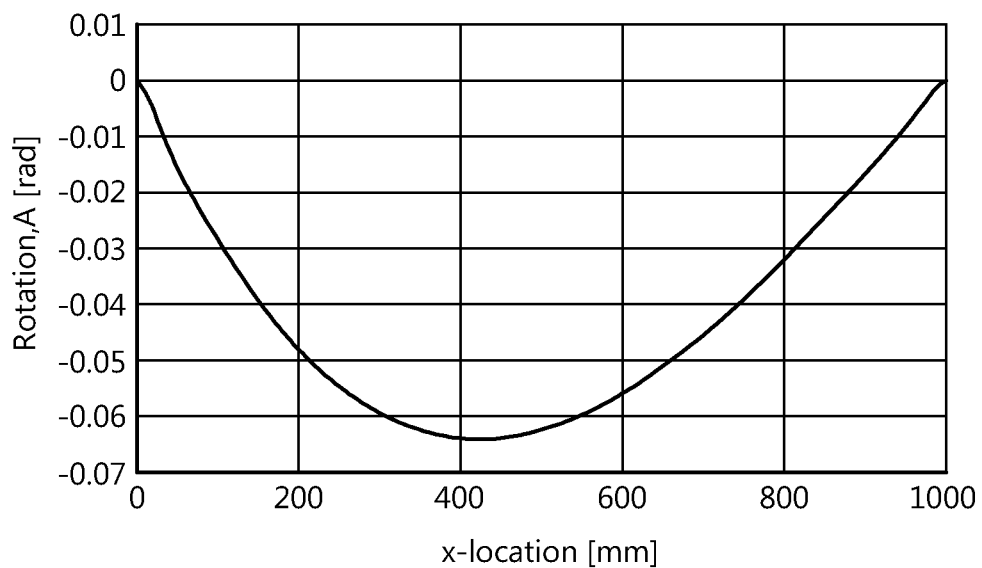
FIG. 5 shows influence line rotations at support.

For $0 < x < L$ $\quad I_{\varphi,supportA} = \dfrac{-x(L-x)(2L-x)}{6EIL} = \dfrac{-x^3 + 3Lx^2 - 2L^2x}{6EIL}$ The resulting influence line for the rotations at the left support (support A) is shown in FIG. 5 for a beam with a length of 1000 mm and a EI of 1.000.000 Nmm². Multiplying the influence line with the magnitude of the load n, $P_n$, and changing x to $x_n$ gives us the rotation at the support due to load n. Summing up all these rotations for load n=1 to n=N gives us the total rotation.

For $0 > x > L$ $\quad \varphi_{A,n} = 0$

For $0 < x < L$ $\quad \varphi_{A,n} = \dfrac{P_n \cdot (-x_n^3 + L^2 x_n)}{6EIL}$ $$\varphi_A = \sum_{n=1}^{N} (\varphi_{A,n}) = \sum_{n=1}^{N} \left(\dfrac{P_n \cdot (-x_n^3 + L^2 x_n)}{6EIL}\right) = \dfrac{1}{EI}\sum_{n=1}^{N} \left(\dfrac{P_n \cdot (-x_n^3 + L^2 x_n)}{6L}\right)$$

Now the bending stiffness can be determined as:

$$EI = \dfrac{1}{\varphi_A} \sum_{n=1}^{N} \left(\dfrac{P_n \cdot (-x_n^3 + L^2 x_n)}{6L}\right)$$

Now the output variables calculated before together with the measured support rotations can be used to determine the bending stiffness of the simply supported beam as a function of time.

The Orthotropic Plate on Spring Supports

Figure 6:
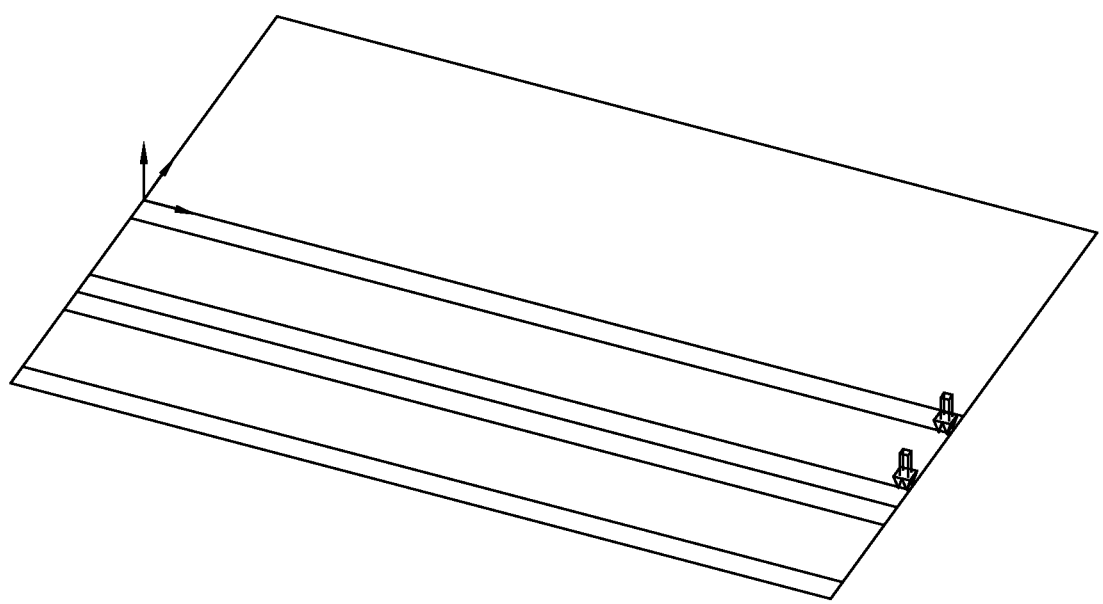
FIG. 6 shows an orthotropic plate on spring supports.
Figure 7:
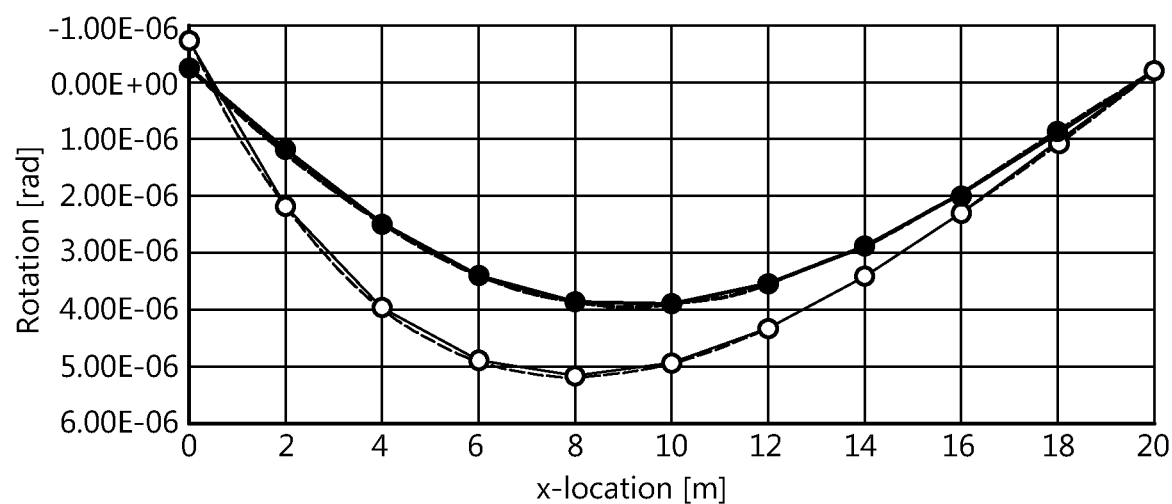
FIG. 7 shows support rotations.

The same method will be applied for the orthotropic plate on spring supports, with the only difference that for each individual lane a separate influence line has to be determined. These influence lines are preferably determined using Scia Engineer instead of hand calculations. The rotations are determined at the central support, indicated in FIG. 6. Rotations are considered in the x-direction. From the Scia engineer model the influence lines for the rotations are derived. This is done by placing an axle load of 1 kN along the defined lanes and determining the rotation at the indicated support. This is shown in FIG. 7.

The influence lines for the rotations at the support are found by performing a fourth order polynomial fit for the obtained data points. A fourth order polynomial has been chosen because this gave a near-perfect fit for the data points. A higher order polynomial would of course give a better fit but this would make the equations harder to handle. As discussed before, this results in the following equations:

$I_{\varphi,Lane\ 1\ \&\ 4} = 9.0071 \cdot 10^{-11} \cdot x^4 - 2.8203 \cdot 10^{-9} \cdot x^3 - 1.9723 \cdot 10^{-8} \cdot x^2 + 8.0688 \cdot 10^{-7} \cdot x - 2.7327 \cdot 10^{-7}$ $I_{\varphi,Lane\ 2\ \&\ 3} = -5.7965 \cdot 10^{-11} \cdot x^4 + 4.8628 \cdot 10^{-9} \cdot x^3 - 1.5914 \cdot 10^{-7} \cdot x^2 + 1.7249 \cdot 10^{-6} \cdot x - 6.8949 \cdot 10^{-7}$ Now to find a value for the bending stiffness (EI) the same procedure as for the simply supported beam model is followed. However this time there is no EI in the equation. To solve this problem the following ratio is added:

$$\dfrac{EI_{theoretical}}{EI_{eq}}.$$

In this ratio EI is the theoretical bending stiffness of the bridge deck used in the Scia model, while $EI_{eq}$ is the bending stiffness we want to obtain using the method:

$$I_{\varphi,Lane\ 1\&4} = \dfrac{EI_{theoretical}}{EI_{eq}}(9.0071 \cdot 10^{-11} \cdot x^4 - 2.8203 \cdot 10^{-9} \cdot x^3 - 1.9723 \cdot 10^{-8} \cdot x^2 + 8.0688 \cdot 10^{-7} \cdot x - 2.7327 \cdot 10^{-7})$$

$$I_{\varphi,Lane\ 2\&3} = \dfrac{EI_{theoretical}}{EI_{eq}}(-5.7965 \cdot 10^{-11} \cdot x^4 + 4.8628 \cdot 10^{-9} \cdot x^3 - 1.5914 \cdot 10^{-7} \cdot x^2 + 1.7249 \cdot 10^{-6} \cdot x - 6.8949 \cdot 10^{-7})$$

Again the output values calculated before together with the measured support rotation at the indicated support can be used to extract values for the $EI_{eq}$. These values should be looked at individually per lane.

In practice it would be difficult to find the exact influence lines from a theoretical model due to the model parameters being largely unknown. It would be easier to obtain these lines by means of calibration. This would be done by having a vehicle of known, large weight with a known axle configuration and speed pass over the bridge deck and measuring the support rotations. Now the resulting rotations should be a superposition of a multiple influence lines for the considered lane.

It should be clear that the description above is intended to illustrate the operation of embodiments of the invention, and not to reduce the scope of protection of the invention. Starting from the above description, many embodiments will be conceivable to the skilled person within the inventive concept and scope of protection of the present invention. Although the detailed description describes the method with reference to a bridge and a bridge deck, the method is also applicable to other infrastructural elements, such as a quay wall, a dike, a water supply duct, a sewer system duct, an electricity line, a road, a lock or a foundation.

The invention claimed is:
1. A method for determining the structural integrity of a bridge, comprising the steps of:
   measuring deformations using sensors positioned at supports of a bridge deck of the bridge;
   determining a load configuration of the bridge deck, the load configuration including loading perpendicular to a longitudinal direction of the bridge deck, wherein the load configuration is derived from reaction forces measured by the sensors positioned at the supports;
   calculating bending stiffness (EI) of the bridge deck at each of a beginning and an end of a predetermined time period, from the load configuration and deformations measured by the sensors; and
   comparing the calculated bending stiffness (EI) at the end of the predetermined time period to the calculated bending stiffness (EI) at the beginning of the predetermined time period to determine a change in the bending stiffness (EI) over the predetermined time period;

wherein the change in the bending stiffness (EI) of the bridge deck over the predetermined time period is calculated based on a moving load passing over the bridge deck, comprising the steps of:

determining a type of the moving load, wherein the moving load is a vehicle having axles;

determining a magnitude of axle loads of the moving load, wherein the axle loads have a static component, a dynamic component and a noise component, and wherein the dynamic component and the noise component of the axle loads are excluded from the calculation of the change in the bending stiffness (EI);

determining a position of the moving load;

determining a speed of the moving load, wherein the speed of the moving load over the bridge deck is constant;

calculating influence lines;

establishing kinematic relations between the load configuration of the bridge deck caused by the moving load and the reaction forces measured by the sensors; and calculating the change in the bending stiffness (EI) of the bridge based on the load configuration resulting from the moving load and the deformations measured by the sensors positioned at the bridge supports.

2. The method according to claim 1, wherein the bridge supports comprise bridge bearings and the sensors are arranged at the bridge bearings, and wherein the sensors establish the reaction forces at the bridge bearings from an elastic deformation and a spring constant of the bridge bearings.

3. The method according to claim 1, further comprising the step of inspecting the bridge when the change in the bending stiffness (EI) exceeds a predetermined value.

4. The method according to claim 1, wherein the deformations include at least one of displacements and rotations.

5. The method according to claim 1, wherein the change in bending stiffness calculated is utilized as a global indicator of an amount of occurred damage.

\* \* \* \* \*